UNITED STATES PATENT OFFICE.

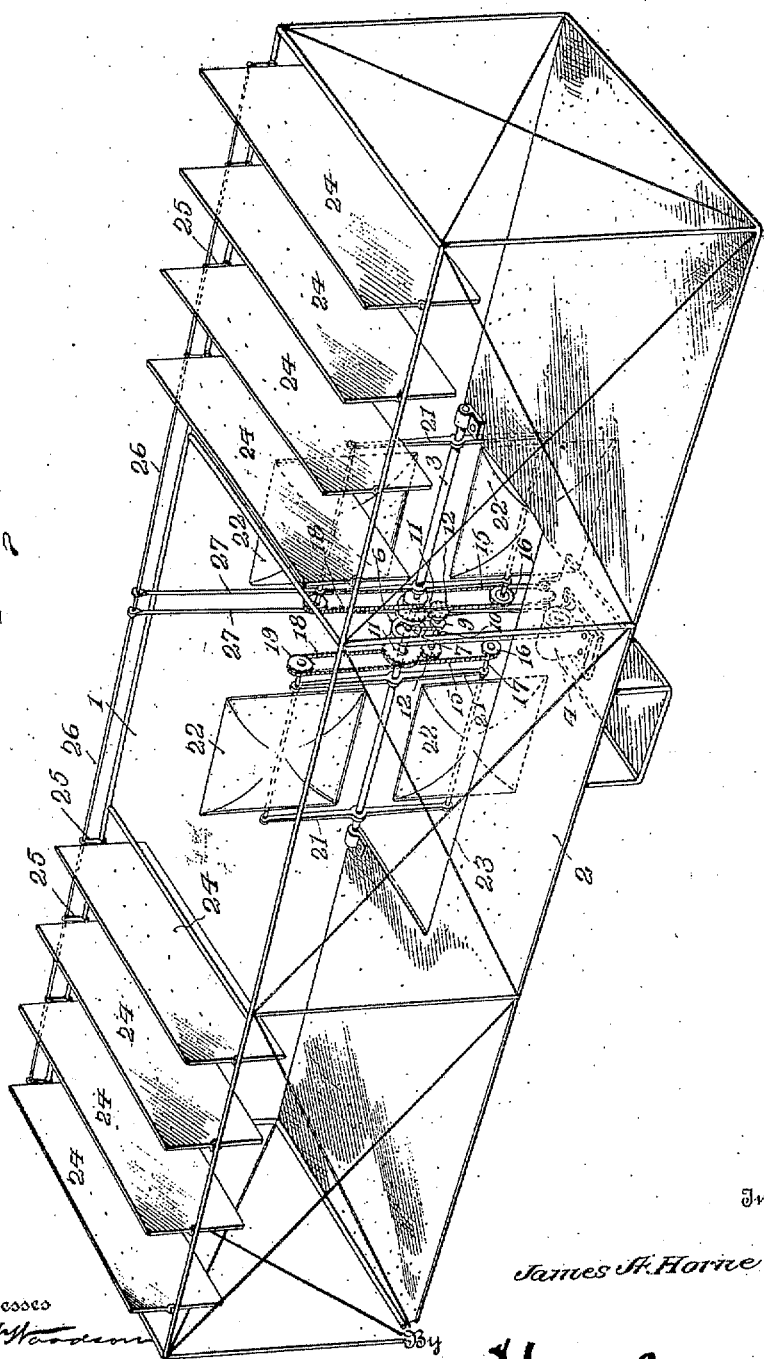

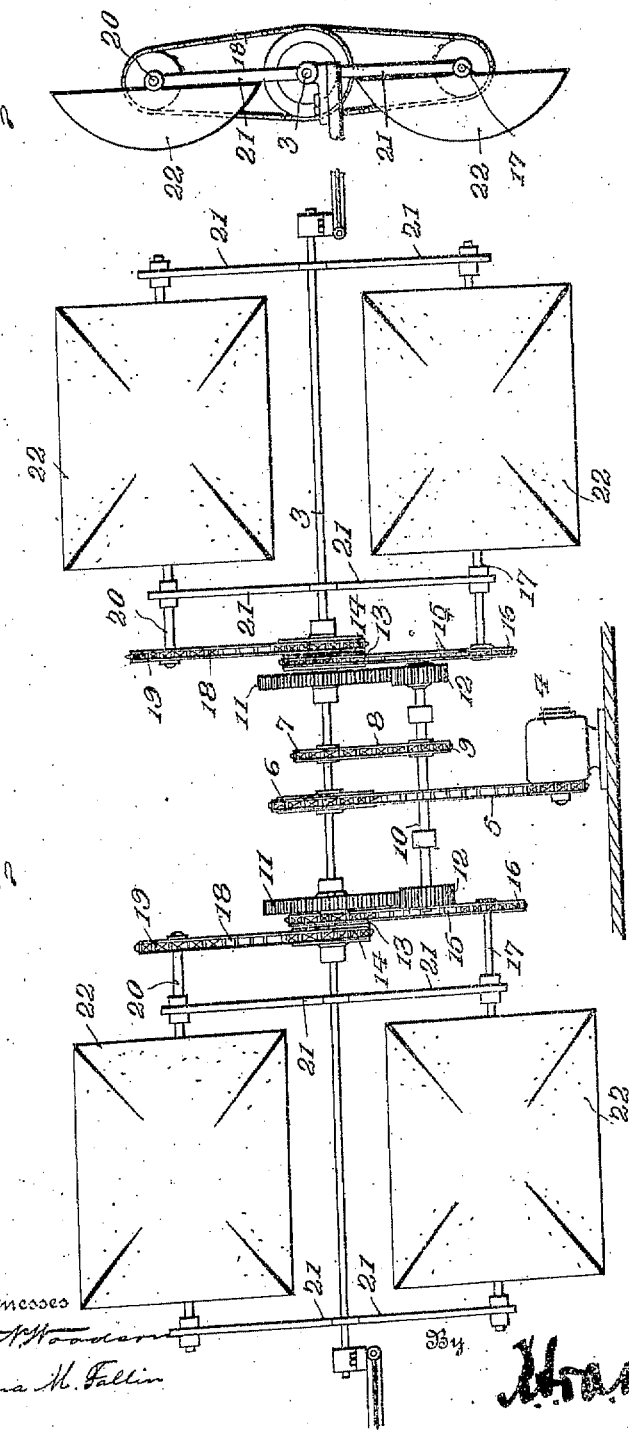

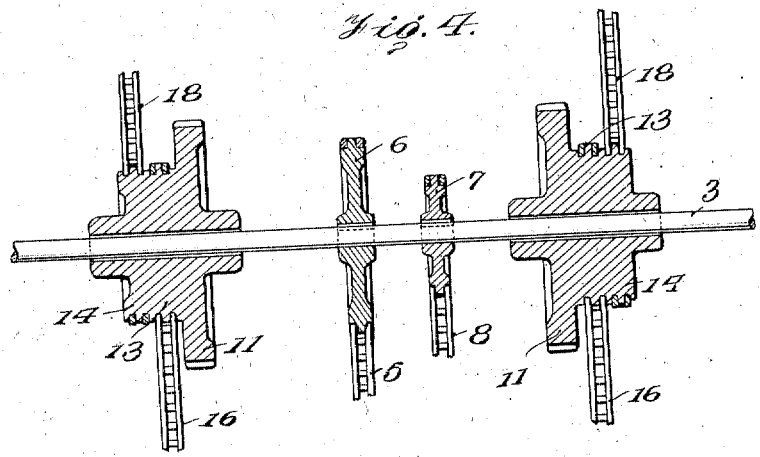
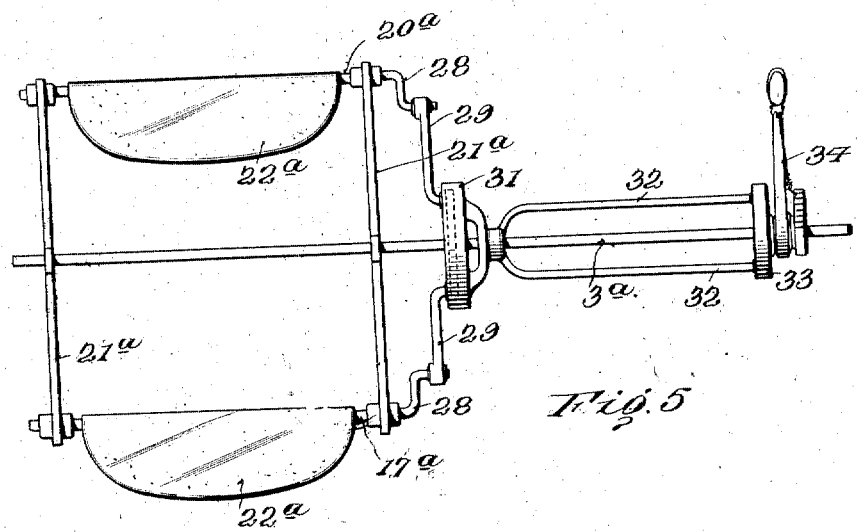
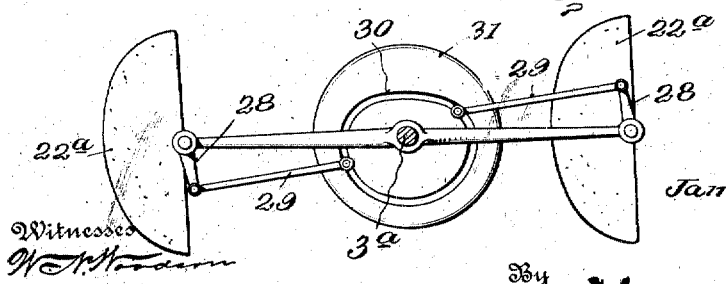

JAMES A. HORNE, OF PORTLAND, OREGON.

FLYING-MACHINE.

985,034.  Specification of Letters Patent. Patented Feb. 21, 1911.

Application filed April 14, 1910. Serial No. 555,388.

*To all whom it may concern:*

Be it known that I, JAMES A. HORNE, a citizen of the United States, residing at Portland, in the county of Multnomah and State of Oregon, have invented certain new and useful Improvements in Flying-Machines, of which the following is a specification.

This invention comprehends certain new and useful improvements in flying machines of the heavier-than-air type, and the invention has for its primary object, an improved construction of aeroplane embodying novel and useful propulsion mechanism, and embodying equalizing or stabilizing devices.

The invention consists in certain constructions, arrangements and combinations of the parts that I shall hereinafter fully describe and claim.

For a full understanding of the invention, reference is to be had to the following description and accompanying drawings in which:

Figure 1 is a perspective view of a flying machine constructed in accordance with my invention. Fig. 2 is an elevation of one form of actuating mechanism; Fig. 3 is an end view thereof; Fig. 4 is a sectional view of some parts of the propelling mechanism; and Figs. 5 and 6 illustrate detail parts of a modification hereinafter specifically referred to.

Corresponding and like parts are referred to in the following description and indicated in all the views of the accompanying drawings by the same reference characters.

The framework of my improved flying machine comprises an aeroplane which in the present instance is of the bi-plane type, embodying an upper plane 1 and a lower plane 2 of any desired construction, the two planes being connected together and braced in any desired way.

A transversely extending main shaft 3 is journaled in suitable bearings on the lower plane 2, said shaft being rotated from a motor 4 by means of a sprocket chain 5 passing around a sprocket wheel 6 fast on said shaft. The shaft 3 carries another fast sprocket wheel 7, and a chain 8 passes around the sprocket 7 and around a similar wheel 9 which is secured to a countershaft 10 disposed underneath the main shaft 3 and supported in any desired way. Loose gear wheels 11 are mounted on the shaft 3 and mesh with spur pinions 12 secured to the shaft 10. Movable with each of the wheels 11 are two sprocket wheels designated by 13 and 14 respectively. Chains 15 extend around the sprocket wheels 13 and also around the sprocket wheels 16 secured to the inner ends of the wing shafts 17. In a similar manner, sprocket chains 18 extend around the sprocket wheels 14 and around corresponding wheels 19 secured to the inner ends of the wing shafts 20. The wing shafts 17 and 20 at opposite sides of the machine are journaled in arms 21 which are secured to and project perpendicularly from the main shaft 3. The shafts 17 and 20 each carry a wing or blade 22 which are preferably concave on one face and convex on the other. These wings may be composed of frames of any desired character supporting the main body portions of silk, or cloth of any kind found suitable for the purpose and they preferably curve inwardly from all points toward the center, as clearly illustrated in the drawing. The lower plane 2 is formed with an opening 23 which may lie entirely within the margins of the plane, or be in the nature of a recess at one edge of the plane as illustrated in Fig. 1, the said opening serving as a clearance for the revolving and rotating wings.

As the motor 4 turns the shaft 3 in one direction and consequently causes the wings to revolve about the shaft 3 as an axis, the gearing hereinbefore described will manifestly rotate the wings in the opposite direction about the shafts 17 and 20 as axes, and by this means, the machine will be lifted without the use of weights, or a running start and will be propelled forwardly, it being understood that the ratio between the gears is properly proportioned for this purpose. It is also to be understood that any type of rudder or steering mechanism may be employed, but as the same does not form part of the present invention, I have omitted, for the sake of clearness, any showing or description of any specific steering apparatus.

In order to maintain or restore the equilibrium of the device, I have provided two sets of equalizing planes, said equalizing planes in the present embodiment of the invention illustrated in Fig. 1, being arranged at opposite ends of the upper plane 1 and substantially forming parts thereof. These equalizing planes designated 24 are mounted to swing laterally so as to present their edges or faces upwardly at the will of the operator, but it is to be understood that in the normal position of the planes 24, they are arranged practically as illustrated in Fig. 1. Each plane 24 is provided at one end with a crank 25, and the cranks for one set of equalizing planes are all connected to a common actuating rod 26. The rods 26 are in turn connected to the hand levers 27 which may be fulcrumed at their lower ends on the lower planes 2, so that the operator may, by moving either lever, close either set of equalizing planes 24, that is, swing them to a horizontal position and thereby secure more resistance at one end of the machine than the other, and thereby restore the equilibrium.

It is to be understood that my invention is not limited to the individual rotation of the several wings. For instance, as indicated in Figs. 5 and 6, the main shaft designated $3^a$ is provided with perpendicular arms $21^a$ and the wings $22^a$ while mounted to turn with their shafts $17^a$ and $20^a$ in the ends of the arms $21^a$ are not intended to be continuously rotated as they revolve about the main shaft. The wings $22^a$, are, however, arranged to turn so that they may be adjusted, and for such purpose, the shafts $17^a$ and $20^a$ are provided at one end with cranks 28 to which links 29 are pivotally connected at one end, and the opposite ends of the links are mounted to travel in a cam groove 30 in a disk 31 which is mounted to turn on the shaft $3^a$. The said disk 31 is provided with laterally extending arms 32 disposed in parallel relation to each other and connected at their inner ends to a disk 33 to which a hand lever is fastened. Manifestly by manipulating the hand lever 34, the disk 31 may be turned, and through the instrumentality of the links 29 and cranks 28 may turn the wings $22^a$ so as to hold them with their concave faces at different angles. For example, when this arrangement of parts is employed, the wings $22^a$ may have their concave faces facing downwardly at the time the machine is started, and consequently, as the shaft $3^a$ is rotated, the wings will have a tendency to raise the machine, and after the machine has risen to the desired height, the hand lever 34 may be shifted so as to turn the wings to the position illustrated in Fig. 6, whereupon the continuous rotation of the shaft $3^a$ will cause the machine to be propelled forwardly. Another advantage of this arrangement is that should any of the mechanism become broken or in any wise unfitted for use, and should it become necessary to descend, all the wings $22^a$ may be turned so that their concave surfaces may be disposed toward the earth, and the entire set of wings may then act as a parachute and retard the descent of the flying machine, thereby promoting the safety of the device and insuring that the operator may alight safely.

Having thus described the invention, what is claimed as new is:

1. In a flying machine, a sustaining plane, a shaft journaled therein, means for rotating said shaft, a countershaft operatively connected to the first-named shaft, arms carried by the first-named shaft, wing shafts journaled in said arms, wings carried by the wing shafts, gear wheels loose on the first named shafts, sprocket wheels also loose on the first named shaft and movable with the respective gear wheels, sprocket wheels carried by the wing shafts, chains extending around said last named sprocket wheels and the first-named sprocket wheels, and pinions secured to the countershaft and meshing with said gear wheels.

2. In a flying machine, a sustaining plane, a shaft journaled therein, means for rotating said shaft, a countershaft, sprocket wheels on the main shaft and countershaft, respectively, a chain extending around said sprocket wheels whereby to rotate the countershaft in the same direction as the first named shaft, arms carried by the first-named shaft, wing shafts journaled in said arms, wings carried by the wing shafts, gear wheels loose on the first-named shafts, and having driving connection with the wing shafts, respectively, and pinions secured to the countershaft and meshing with said gear wheels.

3. In a flying machine, a sustaining plane, a shaft journaled therein, means for rotating said shaft, a countershaft operatively connected to the first named shaft, arms carried by said first named shaft, wing shafts journaled in said arms, wings carried by the wing shafts, gear wheels loose on the first named shaft, and having driving connection with the wing shafts, respectively, and pinions secured to the countershafts and meshing with said gear wheels as and for the purpose set forth.

In testimony whereof, I affix my signature in presence of two witnesses.

JAMES A. HORNE. [L. S.]

Witnesses:
 JOHN L. RAND,
 EDITH STUMP.